United States Patent [19]
Kooima

[11] Patent Number: 6,036,428
[45] Date of Patent: *Mar. 14, 2000

[54] SYSTEM FOR ATTACHING A TOWING APPARATUS TO A ROAD TRACTOR

[76] Inventor: Roger Kooima, 44 Park La. P.O. Box 203, Canton, S. Dak. 57013

[*] Notice: This patent is subject to a terminal disclaimer.

[21] Appl. No.: 09/174,865

[22] Filed: Oct. 19, 1998

Related U.S. Application Data

[63] Continuation of application No. 08/800,662, Feb. 14, 1997, Pat. No. 5,823,735.

[51] Int. Cl.⁷ ........................................ B60P 3/12

[52] U.S. Cl. .................. 414/563; 414/428; 280/402; 280/441.2; 280/433

[58] Field of Search .................... 414/563, 426, 414/427, 428, 546, 686; 280/402, 433, 441.2, 186; 254/3 R

[56] References Cited

U.S. PATENT DOCUMENTS

| | | | |
|---|---|---|---|
| 2,515,833 | 7/1950 | Mueller | 414/563 |
| 3,715,042 | 2/1973 | Rellinger | 414/563 |
| 4,047,733 | 9/1977 | Parkes | 414/563 X |
| 4,640,660 | 2/1987 | Watson | 414/563 |
| 4,842,472 | 6/1989 | Plant | 414/563 |
| 5,249,911 | 10/1993 | Marola | 414/563 |
| 5,326,216 | 7/1994 | Russ | 414/563 |
| 5,823,735 | 10/1998 | Kooima | 414/563 |

*Primary Examiner*—Frank E. Werner
*Attorney, Agent, or Firm*—Kaardal & Associates, PC

[57] ABSTRACT

A new adapter for attaching a wheel lift apparatus to a road tractor for quickly mounting wheel lift apparatus to the road tractor. The inventive device includes a mounting frame having a gooseneck configuration defining a wide end and a narrow end, with the wide end of the mounting frame mounted on the frame of the road tractor, and the narrow end attached to the fifth wheel plate of the road tractor by a kingpin and attached to the tractor frame by link rods.

19 Claims, 5 Drawing Sheets

SYSTEM FOR ATTACHING A TOWING APPARATUS TO A ROAD TRACTOR

CROSS REFERENCE TO RELATED APPLICATION

This application is a continuation of my prior utility patent application Ser. No. 08/800,662, filed Feb. 14, 1997, and issued Oct. 20, 1998 as U.S. Pat. No. 5,823,735.

BACKGROUND OF THE INVENTION

1. Field of the Invention

The present invention relates to mechanisms for towing vehicles and more particularly pertains to a new adapter for attaching a wheel lift apparatus to a road tractor for quickly mounting a towing apparatus to a road tractor.

2. Description of the Prior Art

The use of mechanisms for towing vehicles is known in the prior art. More specifically, mechanisms for towing vehicles heretofore devised and utilized are known to consist basically of familiar, expected and obvious structural configurations, notwithstanding the myriad of designs encompassed by the crowded prior art which have been developed for the fulfillment of countless objectives and requirements.

A known prior art mechanism for towing vehicles includes U.S. Pat. No. 4,632,629. In this mechanism, the lift apparatus is attached to the rear end of a conventional tow truck. This patent does not disclose how such a lift apparatus could be attached to a road tractor.

While this device fulfills its particular objectives and requirements, the aforementioned patent does not disclose a new adapter for attaching a wheel lift apparatus to a road tractor. The inventive device includes a mounting frame having a gooseneck configuration defining a wide end and a narrow end, with the wide end of the mounting frame mounted on the frame of the road tractor, and the narrow end attached to both the fifth wheel plate of the road tractor and the tractor frame.

In these respects, the adapter for attaching a wheel lift apparatus to a road tractor according to the present invention substantially departs from the conventional concepts and designs of the prior art, and in so doing provides an apparatus primarily developed for the purpose of quickly mounting a towing apparatus to a road tractor.

SUMMARY OF THE INVENTION

In view of the foregoing disadvantages inherent in the known types of mechanisms for towing vehicles now present in the prior art, the present invention provides a new adapter for attaching a wheel lift apparatus to a road tractor construction wherein the same can be utilized for quickly mounting a towing apparatus to a road tractor.

The general purpose of the present invention, which will be described subsequently in greater detail, is to provide a new adapter for attaching a wheel lift apparatus to a road tractor apparatus and method which has many of the advantages of the mechanisms for towing vehicles mentioned heretofore and many novel features that result in a new adapter for attaching a wheel lift apparatus to a road tractor which is not anticipated, rendered obvious, suggested, or even implied by any of the prior art mechanisms for towing vehicles, either alone or in any combination thereof.

To attain this, the present invention generally comprises a mounting frame having a gooseneck configuration defining a wide end and a narrow end, with the wide end of the mounting frame mounted on the frame of the road tractor, and the narrow end attached to both the fifth wheel plate of the road tractor and the tractor frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adapter for attaching a wheel lift apparatus to a road tractor apparatus and method which has many of the advantages of the mechanisms for towing vehicles mentioned heretofore and many novel features that result in a new adapter for attaching a wheel lift apparatus to a road tractor which is not anticipated, rendered obvious, suggested, or even implied by any of the prior art mechanisms for towing vehicles, either alone or in any combination thereof.

It is another object of the present invention to provide a new adapter for attaching a wheel lift apparatus to a road tractor which may be easily and efficiently manufactured and marketed.

It is a further object of the present invention to provide a new adapter for attaching a wheel lift apparatus to a road tractor which is of a durable and reliable construction.

An even further object of the present invention is to provide a new adapter for attaching a wheel lift apparatus to a road tractor which is susceptible of a low cost of manufacture with regard to both materials and labor, and which accordingly is then susceptible of low prices of sale to the consuming public, thereby making such adapter for attaching a wheel lift apparatus to a road tractor economically available to the buying public.

Still yet another object of the present invention is to provide a new adapter for attaching a wheel lift apparatus to a road tractor which provides in the apparatuses and methods of the prior art some of the advantages thereof, while simultaneously overcoming some of the disadvantages normally associated therewith.

Still another object of the present invention is to provide a new adapter for attaching a wheel lift apparatus to a road tractor for quickly mounting a towing apparatus to a road tractor.

Yet another object of the present invention is to provide a new adapter for attaching a wheel lift apparatus to a road tractor which includes a mounting frame having a gooseneck configuration defining a wide end and a narrow end, with the wide end of the mounting frame mounted on the frame of the road tractor, and the narrow end attached to both the fifth wheel plate of the road tractor and the tractor frame.

Still yet another object of the present invention is to provide a new adapter for attaching a wheel lift apparatus to a road tractor that keeps undue pressure off the fifth wheel plate of the road tractor.

Even still another object of the present invention is to provide a new adapter for attaching a wheel lift apparatus to a road tractor that permits the tractor to be used for two purposes, thus giving greater versatility to the tractor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
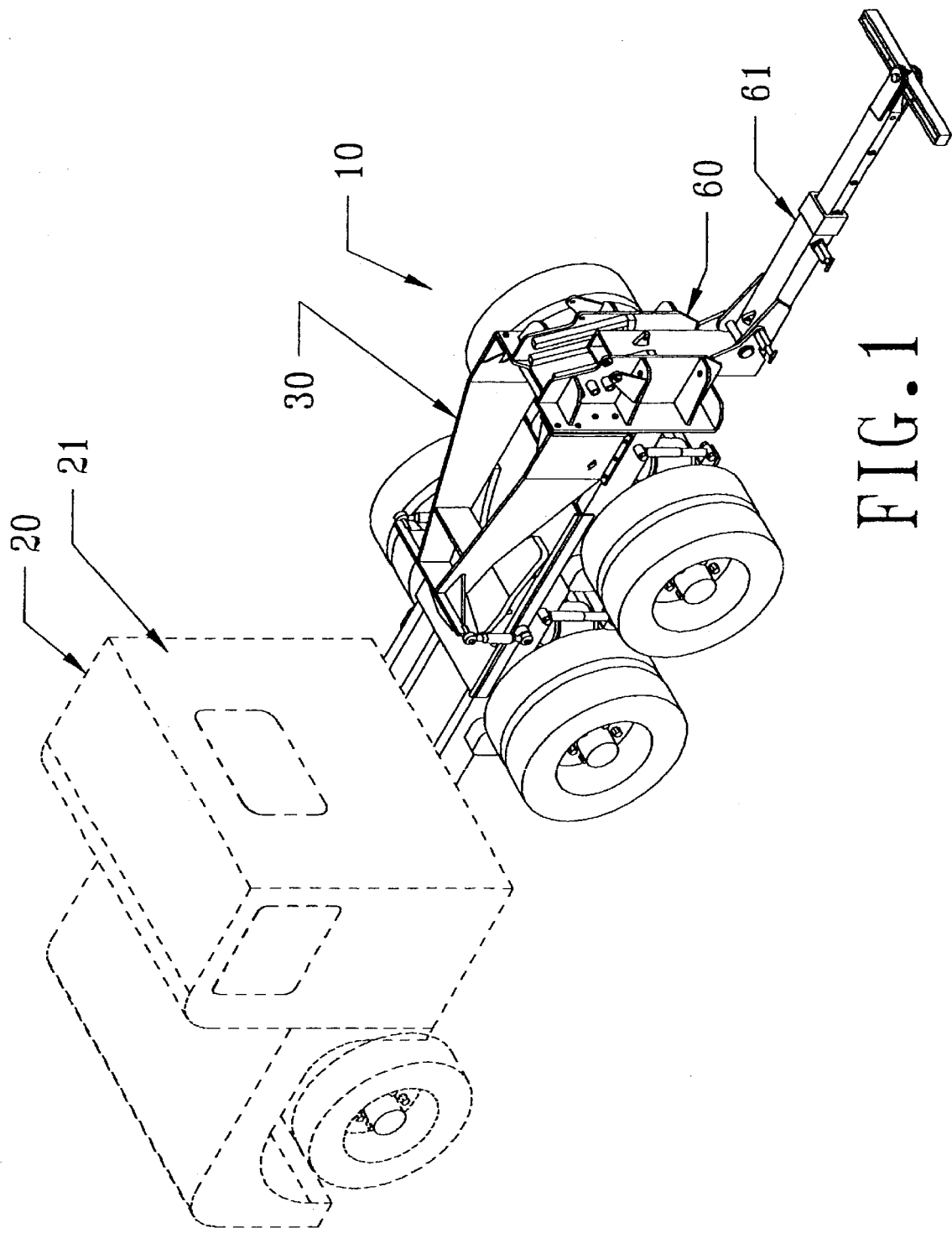
FIG. 1 is an upper perspective view of the adapter and towing apparatus attached to the road tractor according to the present invention.

With reference now to the drawings, and in particular to FIGS. 1 through 5 thereof, a new adapter for attaching a wheel lift apparatus to a road tractor embodying the principles and concepts of the present invention and generally designated by the reference numeral 10 will be described.

As best illustrated in FIGS. 1 through 5, it can be shown that the road tractor 20 is of a conventional type including a cab 21 for a driver, a frame 22, and a plurality of wheels 23 attached to the frame. The frame 22 includes two beams 24 extending from the rear of the cab 21, and the wheels 23 are connected to the beams. A fifth wheel plate 25 is mounted on the frame 22 by a fifth wheel mounting plate 26.

The plate 26 extends between, and is attached to, the beams 24. The fifth wheel plate 25 includes a narrowing slot 27 leading towards a central opening (not shown) for matingly receiving a kingpin 45 of the adapter 10, to be later described. The tractor so far described is conventional, and is therefore not further described in detail.

Figure 3:
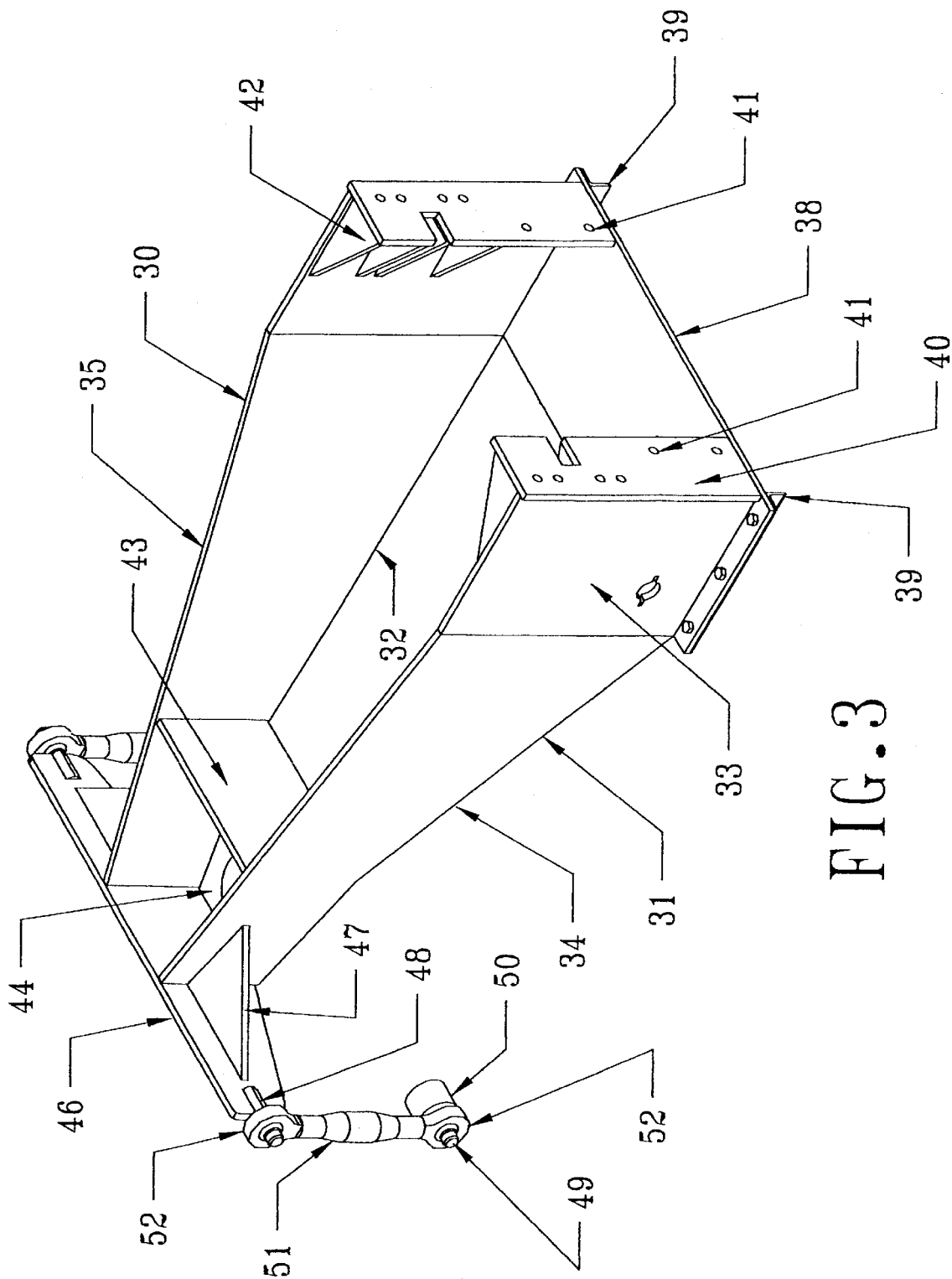
FIG. 3 is a perspective view of just the adapter mounting apparatus.
Figure 4:
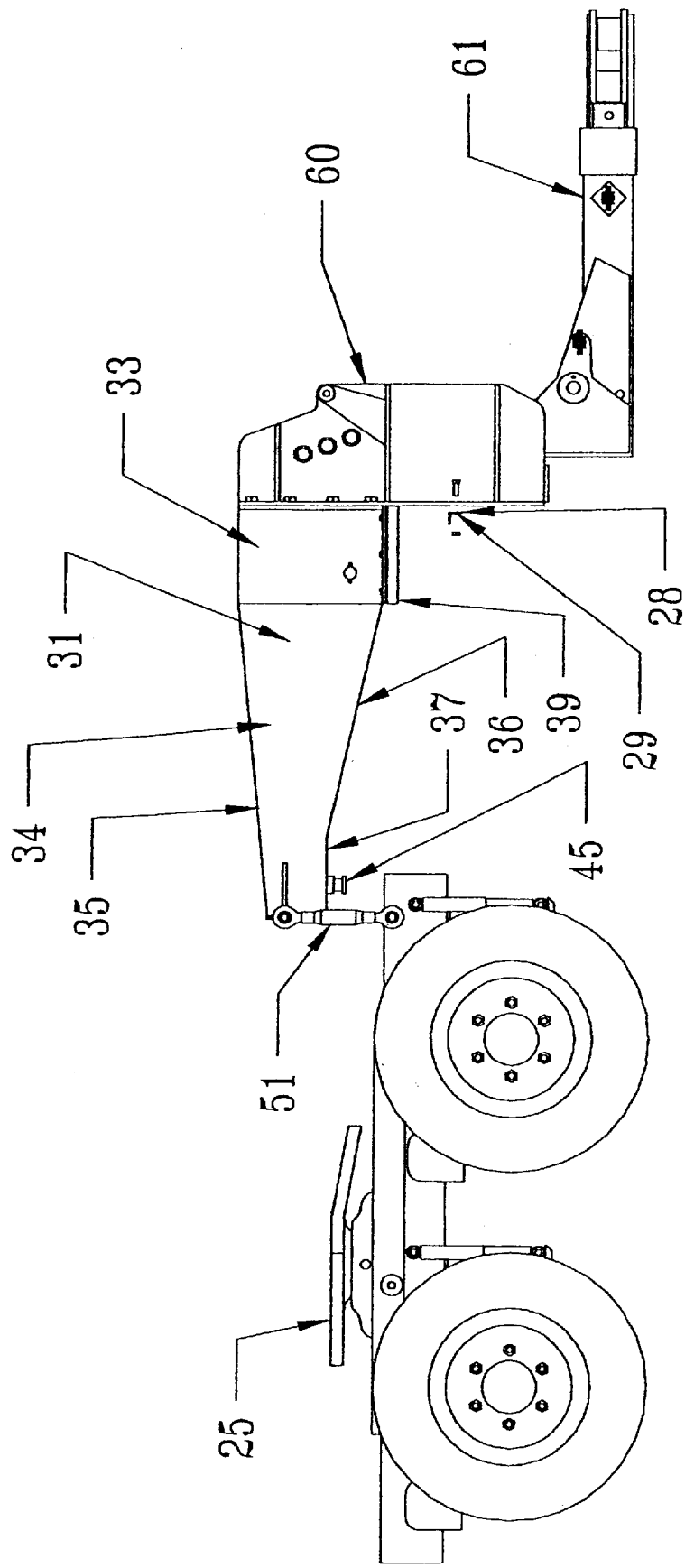
FIG. 4 is a side view of the adapter and towing apparatus as a unit removed from the tractor.
Figure 5:
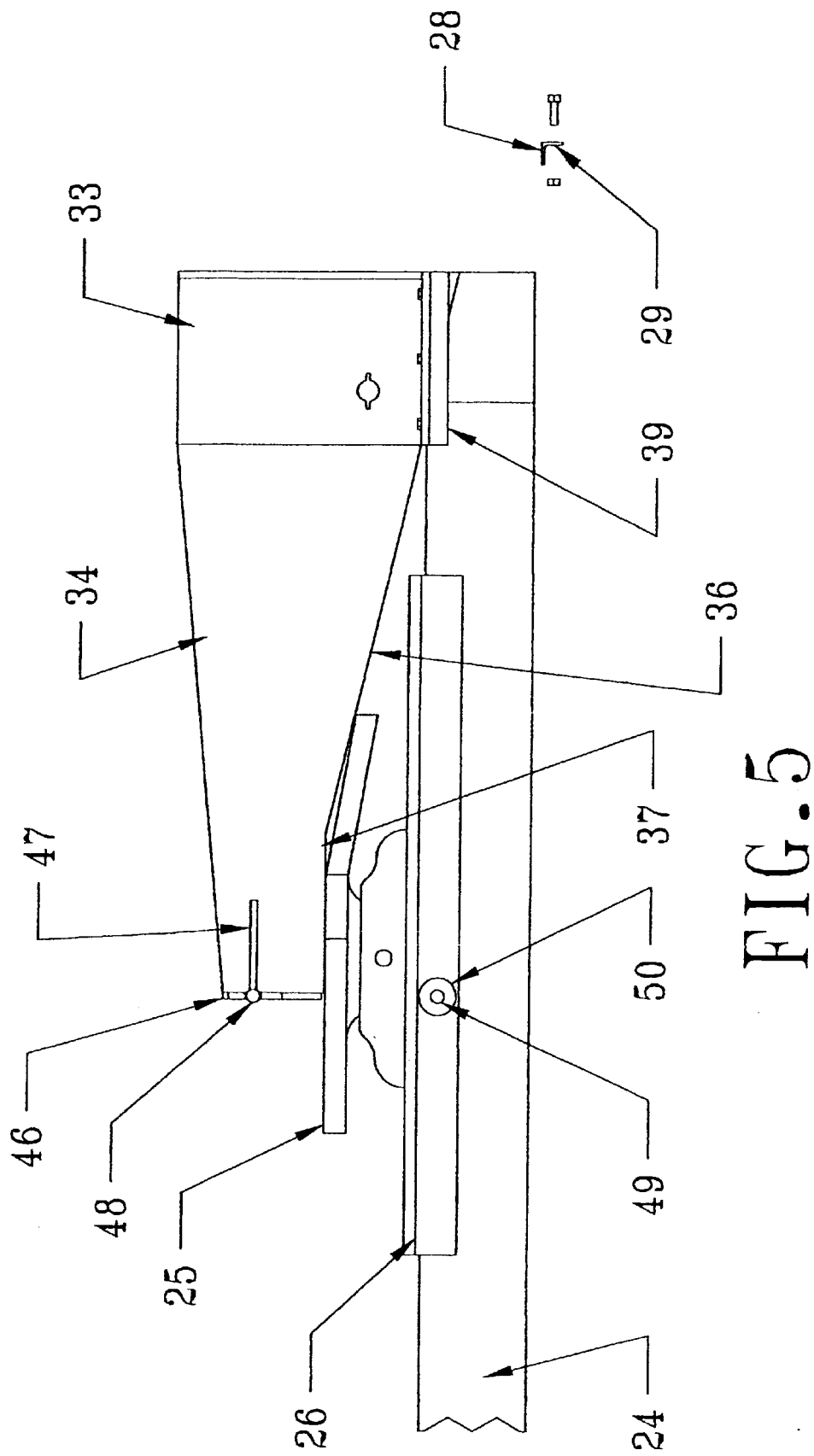
FIG. 5 is a side view showing the adapter mounted on the tractor frame.

The adapter 10 includes a mounting frame 30 for mounting on the frame 22 of the tractor 20. The frame 30 includes vertically oriented, spaced side plates 31,32 extending between opposite ends of the frame. The plates 31,32 are identical, and thus only one plate 31 will be described in detail. The plate 31 has a first portion 33 at a first end having a constant vertical height, and a second portion 34 extending at an angle from the first portion 33. As best illustrated in FIGS. 4 and 5, the top edge 35 of the second portion 34 has a constantly reducing slope to the end of the portion 34, while the bottom edge includes a first sloped portion 36 leading to a horizontal portion 37. Thus the vertical height of the second portion reduces towards the end of the frame 30. In addition, as can be seen in FIG. 3, the first portions 33 of each side plate 31,32 are spaced apart a first, constant distance, while the second portions 34 are angled toward each other so that the distance therebetween is constantly reduced towards the other end of the frame 30. Thus the frame defines a "gooseneck" configuration, due to the reduced spacing and the reduced vertical height.

Figure 2:
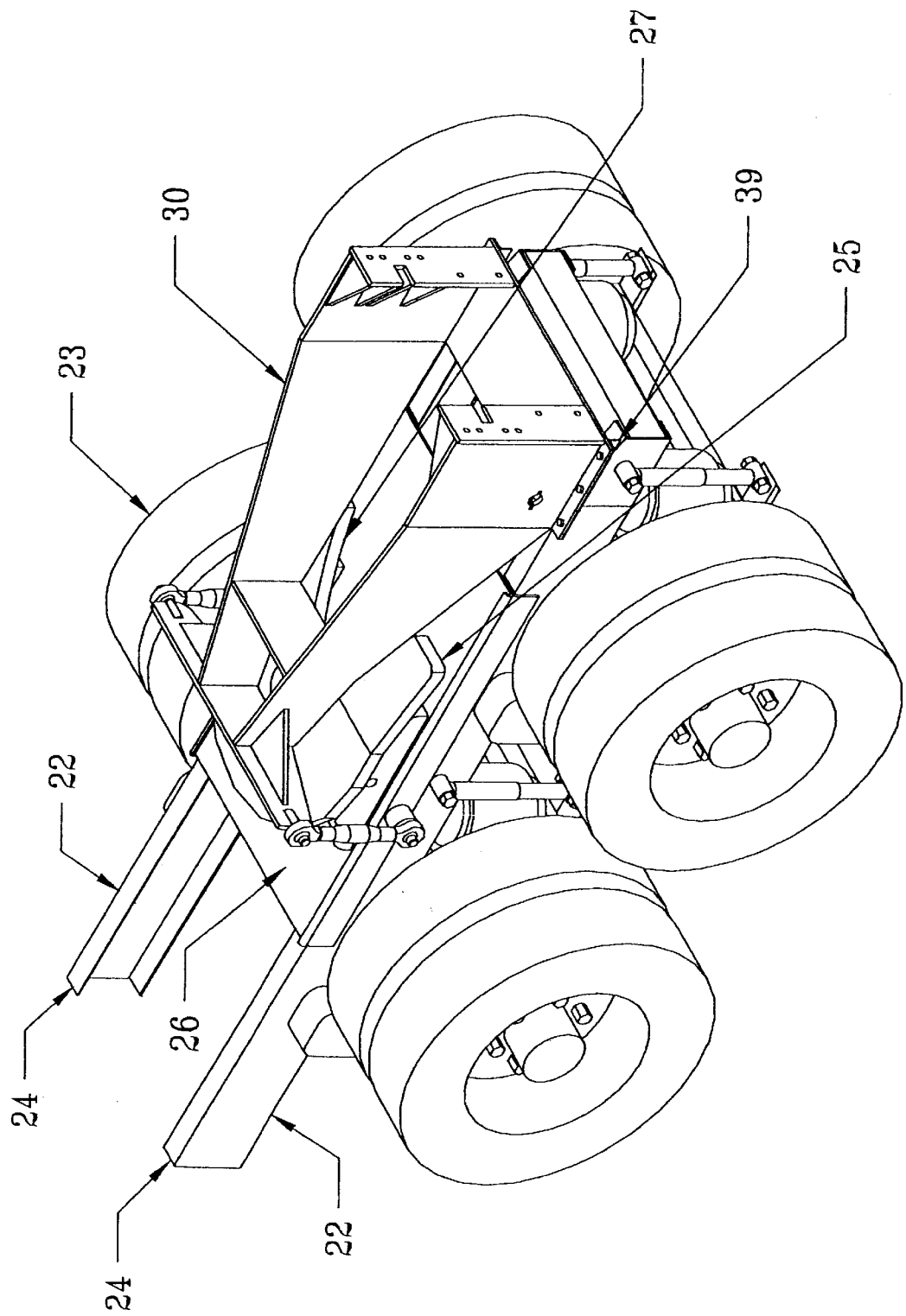
FIG. 2 is a view similar to FIG. 1, but with the towing apparatus removed.

The frame 30 also includes a cross plate 38 at the first end extending between bottom edges of the first portions 33 for maintaining the distance between the portions 33. Attached to the bottom of the plate are two angle brackets 39. The brackets are oriented such that when the frame 30 is mounted on the tractor, the brackets 39 are disposed on the outside of the beams 24 to prevent side to side movements of the frame 30, as best illustrated in FIGS. 2 and 5. Plates 40 are attached to the ends of the portions 33, enabling attachment of a wheel lift towing apparatus 60. The plates 40 includes suitably located holes 41 for receiving fasteners which secure the towing apparatus 60 to the frame 30. Bracing members 42 extend between the portions 33 and the plates 40 for bracing the plates 40.

A bracing plate 43 extends between the portions 34 at an intermediate location thereof for maintaining the spacing between the portions 34. The side plates 31,32 are otherwise unconnected between the cross plate 38 and the bracing plate 43. A plate 44 also extends between the bottom edges 37 of the second portions 34 at the second end of the frame 30. Extending from the bottom of the plate 44 is a kingpin 45 which is sized and shaped to fit within the central opening of the fifth wheel plate, in a conventional manner.

End plate 46 is connected to the ends of the portions 34 at the second end of the frame 30. The end plate 46 has a length approximately equal to the distance between the first side plate portions 33. Brace members 47 extend between the end plate and the portions 34 to make a rigid connection.

Due to the weight of the towing apparatus 60, extreme pressures are produced in the connection between the kingpin 45 and the fifth wheel plate 25. Therefore a means for connecting the frame 30 to the tractor frame 22 is provided to accommodate a share of the load and prevent undue pressure on the fifth wheel plate/kingpin connection. Pins 48 are connected to the ends of the plate 46 and extend outward therefrom. Additionally, pins 49 are attached to the plate 26 by bushings 50 securely connected to the plate 26. As shown in FIG. 5, the pins 48,49 are vertically aligned. A link rod 51 is connected at each of its ends to the pins 48,49. The rods 51 define apertured ends 52 through which extend the pins.

Either the ends 52 or the pins 48,49 should include a means for permitting slight angular movements between the pins and rods, to accommodate flexing of the frame 30 and frame 22. The rods 51 are preferably made of forged metal, but could also be made of suitable composite materials.

The towing apparatus 60 is suitably attached to the plates 40. The towing apparatus 60 is preferably of the underreach type, having an arm 61 adapted to reach under a vehicle to be towed and securely attached to that vehicle. The apparatus can be powered by a self contained power unit, or by hydraulic power provided by the road tractor. The towing apparatus is generally conventional, and need not be further described. Any type of towing apparatus can be utilized, so long as it is able to be attached to the adapter 10.

In order to prevent the adapter and towing apparatus from moving vertically upward relative to the tractor frame while mounted thereon, angle clips 28 are provided which are attached to the towing apparatus and loosely disposed underneath respective beams 24 of the tractor frame when the adapter and towing apparatus are mounted, as is evident from FIGS. 4 and 5. The clips 28 contain apertures 29 therethrough which receive fasteners extending from suitable locations on the towing apparatus to secure the clips thereto. When the adapter and towing apparatus are slid onto the frame, the clips fit underneath the beams 24 to prevent upward vertical movement of the assembly.

In use, the adapter and towing apparatus are secured together by mounting the towing apparatus to the plates 40 using appropriate fasteners. The unit is then slid over the top of the tractor frame until the kingpin 45 slides into the slot 27 and the central opening of the fifth wheel plate 25. In this position, the first, wide end of the adapter is mounted on, and supported by, the beams 24 of the tractor frame 22. The angle brackets 39 prevent movement of the adapter from side to side by engaging the outer sides of the beams 24. The link rods 51 are attached to the pins 48,49 to secure the second, narrow end of the adapter to the tractor frame. The clips attached to the towing apparatus are disposed underneath the beams when the unit is mounted on the frame to prevent upward vertical movements of the unit. The adapter and towing apparatus can thus be attached and removed as a unit, as illustrated in FIG. 4, to make attachment and removal a one person job. A stand can be utilized to support the adapter and towing apparatus unit when not mounted on the road tractor. It should be noted that the adapter can first be mounted to the tractor frame and then the towing apparatus can be attached to the adapter after mounting.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim is:

1. A mounting apparatus for attaching a towing apparatus to a road tractor, the road tractor having a tractor frame with a front and rear, said road tractor having a fifth wheel plate mounted on the tractor frame between said front and rear, said tractor frame having a forward portion between the fifth wheel plate and the front of said frame, said tractor frame having a rearward portion between the fifth wheel plate and the rear of said tractor frame, said mounting apparatus comprising:

a generally elongate mounting frame having first and second ends;

said first end being adapted for supportive mounting on the rearward portion of said tractor frame and adapted for attachment to the towing apparatus;

a kingpin for attaching the second end of the mounting frame to the fifth wheel plate; and at least one link member for linking the second end of the mounting frame to the tractor frame, said link member having opposite upper and lower ends defining a length therebetween, said upper end being mounted on the mounting frame forward of the kingpin, said lower end being adapted for mounting to said tractor frame forward of said kingpin when said kingpin is attached to the fifth wheel plate, wherein said link member is adapted to resist the upward vertical force applied by said kingpin to the fifth wheel plate of the tractor frame.

2. The mounting apparatus of claim 1 including a pair of link members having opposite upper and lower ends, said link members being laterally spaced on opposite sides of the longitudinal axis of said tractor frame.

3. The mounting apparatus of claim 1 wherein said link member is mounted in a location substantially adjacent to the fifth wheel plate when said kingpin is attached to the fifth wheel plate.

4. The mounting apparatus of claim 1 wherein the second end of said mounting frame is adapted for resting on the fifth wheel plate when said kingpin of said mounting frame is attached to said fifth wheel plate, and wherein the first end of said mounting frame is adapted to rest on the rearward portion of said tractor frame at all times when the kingpin of said mounting frame is attached to said fifth wheel plate such that said mounting frame is supported on a tractor frame at all times by said fifth wheel plate and the rearward portion of said tractor frame without resting on the forward portion of said tractor frame.

5. The mounting apparatus of claim 1 wherein the mounting frame includes an end plate located at the second end of said mounting frame and extending substantially transverse to the longitudinal axis of the said trailer frame, said end plate having opposite end edges with the upper end of said link member being mounted on an end edge of said end plate.

6. The mounting apparatus of claim 1 wherein the mounting frame includes a pair of upper mounting pins mounted on and laterally projecting from the second end of said mounting frame, and a pair of lower mounting pins for projecting laterally from said tractor frame.

7. The mounting apparatus of claim 1 wherein the link member comprises an elongate rod.

8. The mounting apparatus of claim 1 further comprising shift prevention plates attached to said mounting frame adjacent said first end thereof for preventing sideways shifting movement of the mounting frame relative to the tractor frame, said shift prevention plates depending from said mounting frame in a laterally spaced relationship with respect to each other to engage lateral sides of said tractor frame, said shift prevention plates being adapted to remain in contact with the rearward portion of said tractor frame at all times when the kingpin is attached to said fifth wheel plate.

9. The mounting apparatus of claim 1 including at least one pair of link members, each link member of said pair of link members being laterally spaced on opposite sides of a longitudinal axis of said mounting frame.

10. The mounting apparatus of claim 1 wherein said link member is mounted in a location substantially laterally outwardly from the fifth wheel plate when said kingpin is attached to the fifth wheel plate.

11. The mounting apparatus of claim 1 wherein the second end of said mounting frame is adapted for resting on the fifth wheel plate when said kingpin of said mounting frame is attached to said fifth wheel plate, and wherein the first end of said mounting frame is adapted to rest on the rearward portion of said tractor frame at all times when the kingpin of said mounting frame is attached to said fifth wheel plate such that said mounting frame is supported on a tractor frame at all times by said fifth wheel plate and the rearward portion of said tractor frame.

12. The mounting apparatus of claim 1 additionally comprising an upper mounting pin mounted on said mounting frame at a location laterally outward from said mounting frame, and a lower mounting pin for mounting to said tractor frame at a location laterally outward from said tractor frame such that a link member mounted to said upper and lower mounting pins is positioned laterally outward from said tractor frame.

13. The mounting apparatus of claim 1 additionally comprising an upper mounting pin mounted on said mounting frame at a location laterally outward from said mounting frame, and a lower mounting pin for mounting to said tractor frame at a location laterally outward from said tractor frame such that a link member mounted to said upper and lower mounting pins is positioned laterally outward from said tractor frame.

14. A mounting apparatus for mounting a towing apparatus to a road tractor having a tractor frame with a front and rear, said road tractor having a fifth wheel plate mounted on the tractor frame between said front and rear, said tractor frame having a forward portion between the fifth wheel plate and the front of said frame, said tractor frame having a rearward portion between said fifth wheel plate and the rear of said frame, comprising:

a generally elongate mounting frame having first and second ends;

said first end of said mounting frame being adapted for mounting on the rearward portion of said tractor frame and being adapted for mounting to the towing apparatus;

a kingpin attached to the mounting frame adjacent the second end thereof for connecting the second end to the fifth wheel plate of the tractor frame; and at least one link member connected at one end to the mounting frame adjacent the second end thereof and adapted to be attachable to the tractor frame, said link member being adapted for resisting upward vertical movement of the second end of said mounting frame with respect to the fifth wheel plate of said tractor frame to resist any upward vertical force applied by said mounting frame to said fifth wheel plate;

wherein the first end of said mounting frame is adapted to rest on the rearward portion of said tractor frame at all times when the kingpin of said mounting frame is attached to said fifth wheel plate such that said mounting frame is supported on a tractor frame at all times by said fifth wheel plate and the rearward portion of said tractor frame for minimizing the extension of the second end of the mounting frame forward of the fifth wheel plate.

15. The mounting apparatus of claim 14 including at least one pair of link members, each link member of said pair of link members being laterally spaced on opposite sides of the longitudinal axis of said mounting frame.

16. The mounting apparatus of claim 14 wherein said link member is mounted in a location substantially laterally outwardly from the fifth wheel plate when said kingpin is attached to the fifth wheel plate.

17. The mounting apparatus of claim 14 further comprising shift prevention plates attached to said mounting frame adjacent said first end thereof for preventing sideways shifting movement of the mounting frame relative to the tractor frame, said shift prevention plates depending from said mounting frame in a laterally spaced relationship with respect to each other to engage lateral sides of said tractor frame, said shift prevention plates being adapted to remain in contact with the rearward portion of said tractor frame at all times when the kingpin is attached to said fifth wheel plate.

18. A towing system comprising:
a road tractor having a tractor frame with a front and rear, said road tractor having a fifth wheel plate mounted on the tractor frame between said front and rear, said tractor frame having a forward portion between the fifth wheel plate and the front of said frame, said tractor frame having a rearward portion between the fifth wheel plate and the rear of said tractor frame;

a towing apparatus; and a mounting apparatus attaching said towing apparatus to said road tractor, said mounting apparatus comprising:
a generally elongate mounting frame having first and second ends;
said first end being supportively mounted on the rearward portion of said tractor frame, said towing apparatus being mounted on the first end of said mounting frame;
a kingpin for attaching the second end of the mounting frame to the fifth wheel plate; and
at least one link member linking the second end of the mounting frame to the tractor frame, said link member having opposite upper and lower ends defining a length therebetween, said upper end being mounted on the mounting frame forward of the kingpin, said lower end being mounted on said tractor frame forward of said kingpin, wherein said link member resists any upward vertical force applied by said kingpin to the fifth wheel plate of the tractor frame.

19. A mounting apparatus for attaching a towing apparatus to a road tractor, the road tractor having a tractor frame with a front and rear, said road tractor having a fifth wheel plate mounted on the tractor frame between said front and rear, said tractor frame having a forward portion between the fifth wheel plate and the front of said frame, said tractor frame having a rearward portion between the fifth wheel plate and the rear of said tractor frame, said mounting apparatus comprising:

a generally elongate mounting frame having first and second ends, said first end being adapted for supportive mounting on the rearward portion of said tractor frame, said first end being adapted for attachment to the towing apparatus;

a kingpin for attaching the mounting frame to the fifth wheel plate of said tractor frame; and at least one pair of link members for linking the mounting frame to the tractor frame, each link member of said pair of said link members having opposite upper and lower ends, said upper end being mounted on the mounting frame, said lower end being adapted for mounting to said tractor frame, wherein said link member is adapted to resist the upward vertical force applied by said kingpin to the fifth wheel plate of the tractor frame;

shift prevention plates attached to said mounting frame adjacent said first end thereof for resisting lateral shifting movement of the mounting frame relative to the tractor frame, said shift prevention plates depending from said mounting frame in a laterally spaced relationship, said shift prevention plates being adapted to remain in contact with the rearward portion of said tractor frame at all times when the kingpin is attached to said fifth wheel plate.

* * * * *